(No Model.)  9 Sheets—Sheet 1.

F. A. LANE.
ELECTRIC INDICATOR.

No. 427,879. Patented May 13, 1890.

Witnesses:

Inventor
Frederic A. Lane.
By Geo. D. Seymour,
Atty.

(No Model.) 9 Sheets—Sheet 2.
F. A. LANE.
ELECTRIC INDICATOR.
No. 427,879. Patented May 13, 1890.
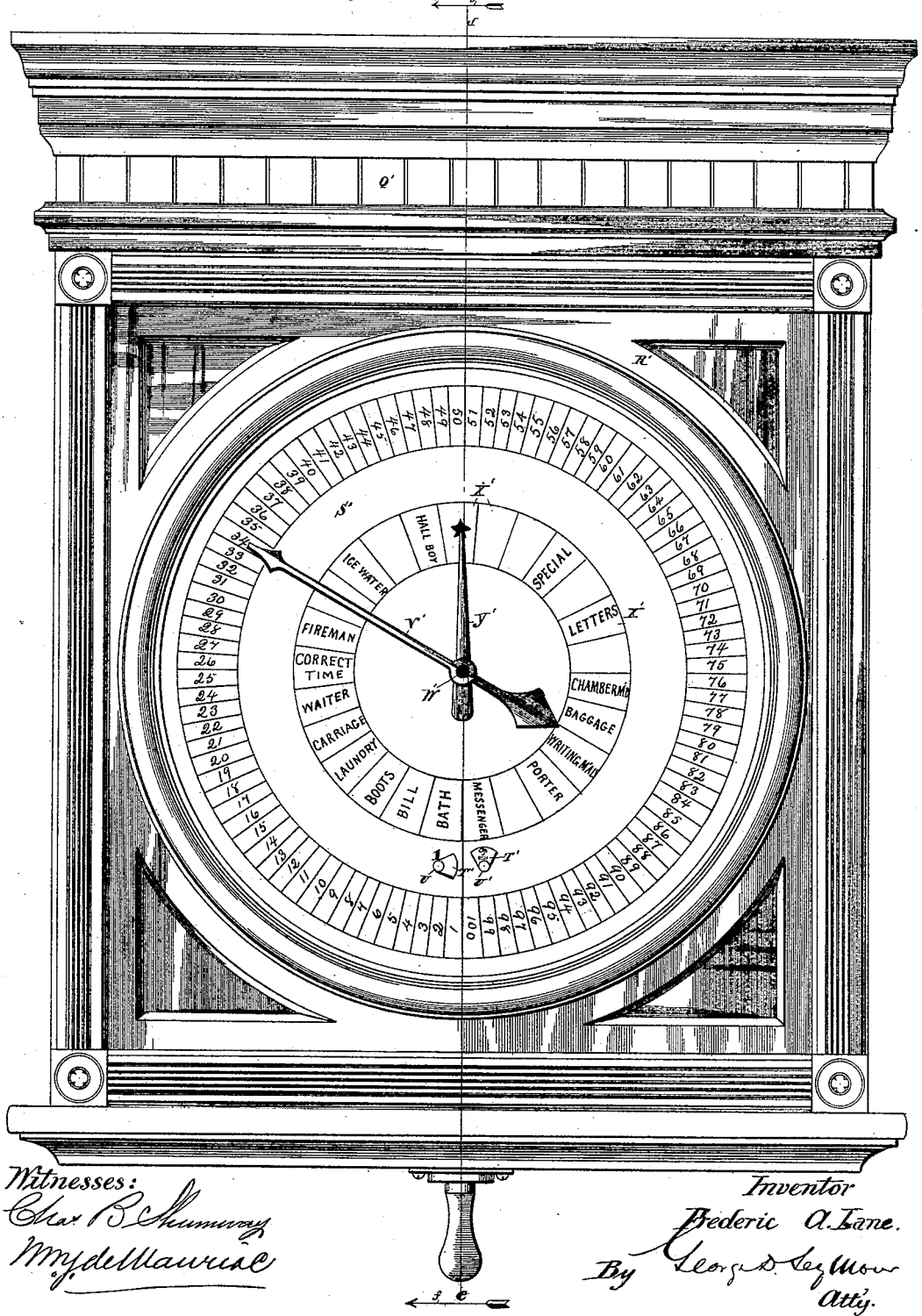

(No Model.) 9 Sheets—Sheet 3.

F. A. LANE.
ELECTRIC INDICATOR.

No. 427,879. Patented May 13, 1890.

Witnesses:

Inventor
Frederic A. Lane.
By George D. Seymour
Atty.

(No Model.)　　　　　　　　　　　　　　　　　　　9 Sheets—Sheet 4.
F. A. LANE.
ELECTRIC INDICATOR.
No. 427,879.　　　　　　　　　　　Patented May 13, 1890.
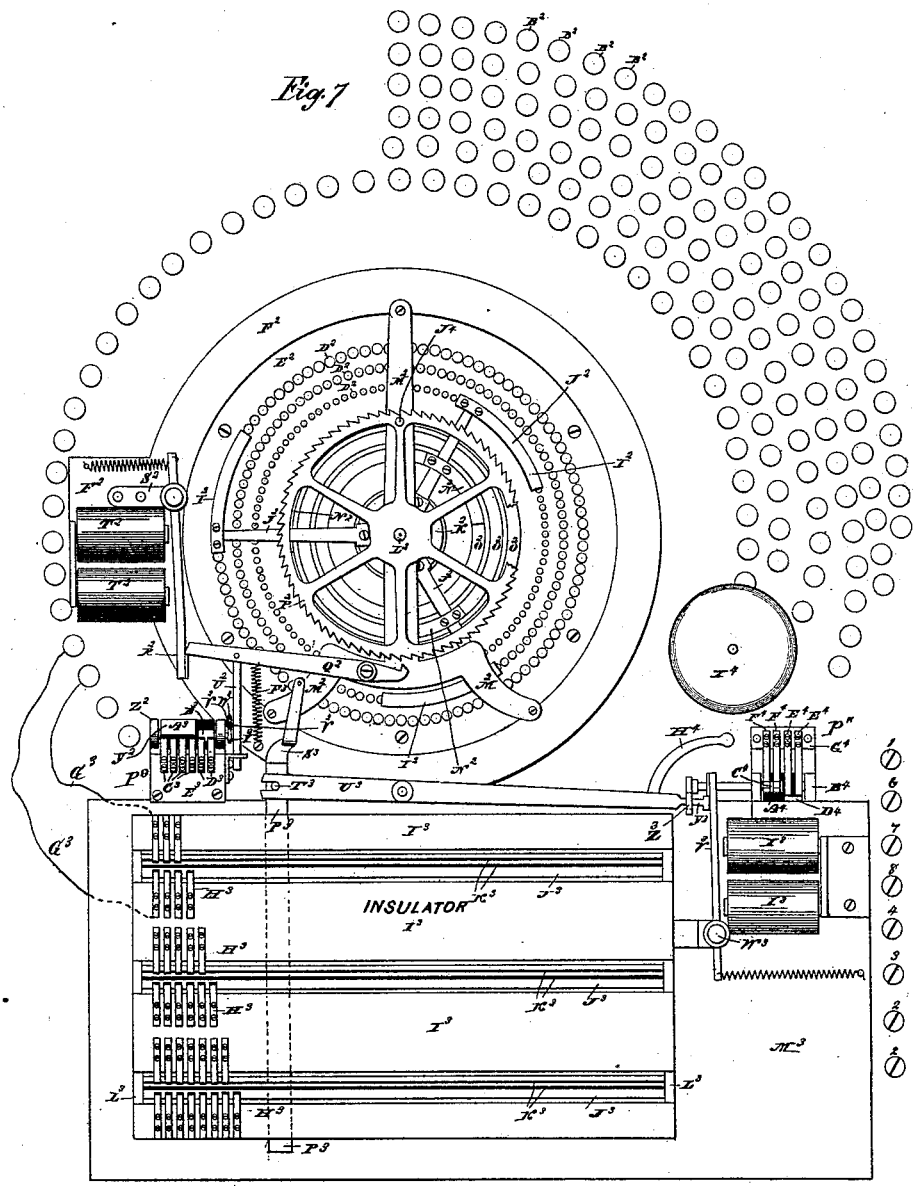
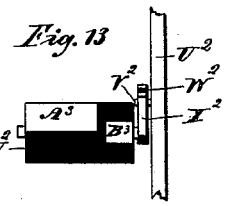
Witnesses　　　　　　　　　　　　　　　　　　Inventor
　　　　　　　　　　　　　　　　　　　　Frederick A. Lane.

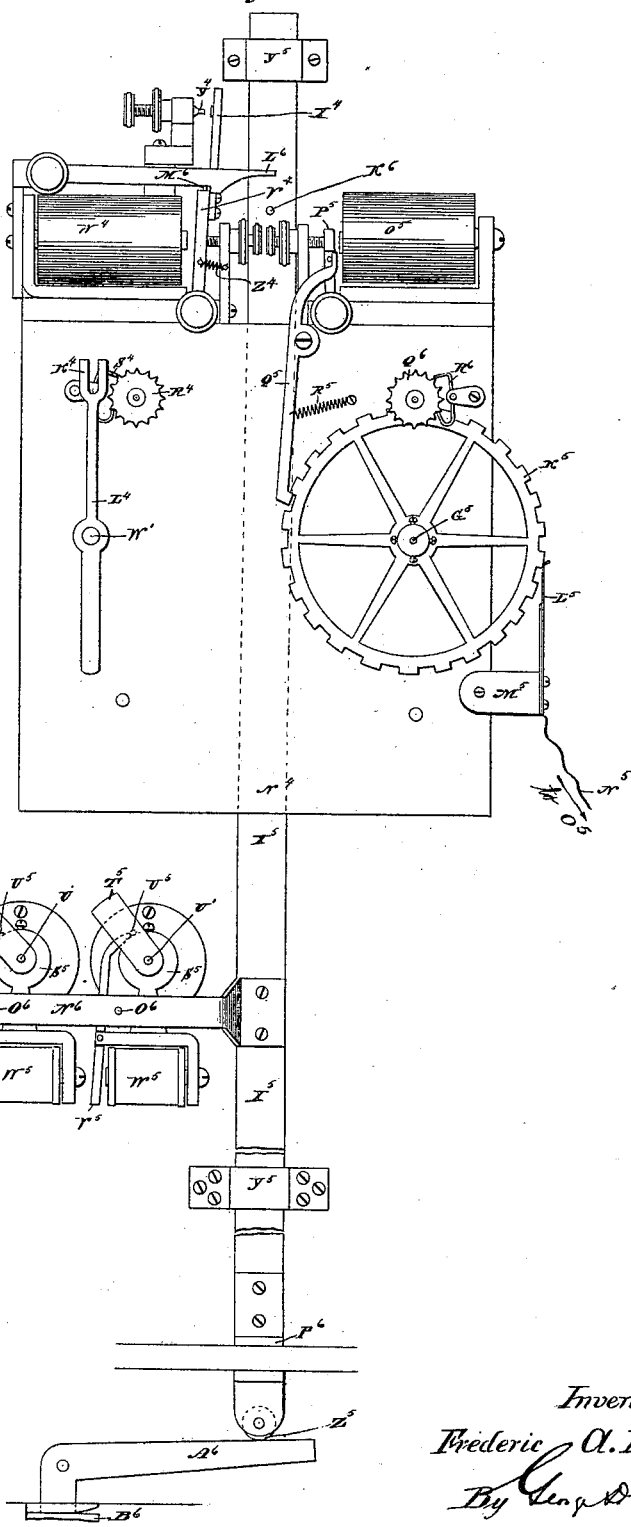

(No Model.) 9 Sheets—Sheet 6.
F. A. LANE.
ELECTRIC INDICATOR.

No. 427,879. Patented May 13, 1890.

Witnesses

Inventor
Frederic A. Lane,
By George D. Seymour
Atty.

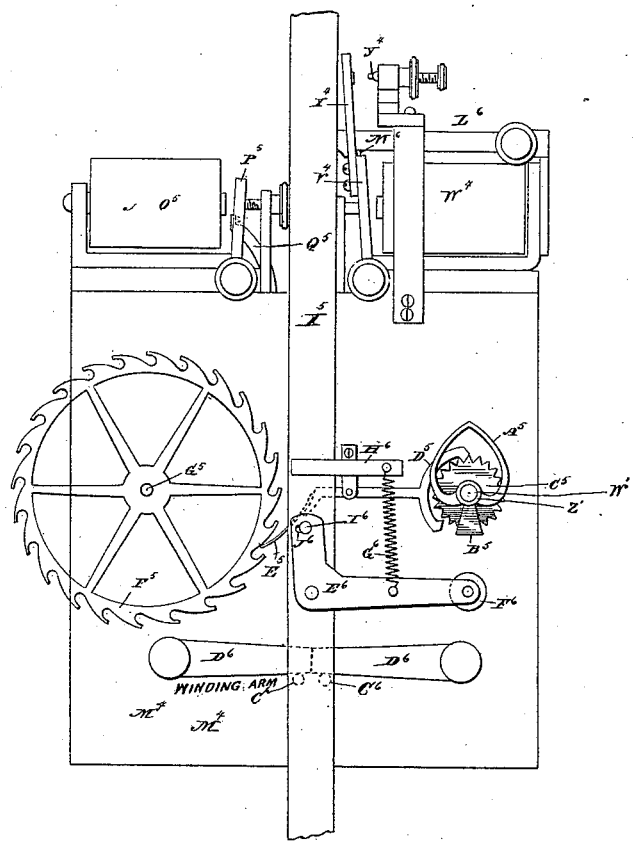

(No Model.)

9 Sheets—Sheet 8.

F. A. LANE.
ELECTRIC INDICATOR.

No. 427,879. Patented May 13, 1890.

Witnesses:

Inventor
Frederic A. Lane
By Geo. O. Seymour
Atty.

(No Model.)

F. A. LANE.
ELECTRIC INDICATOR.

No. 427,879.

9 Sheets—Sheet 9.

Patented May 13, 1890.

Witnesses:
Chas. B. Shumway
M. J. de Mauriac

Inventor
Frederic A. Lane.
By George D. Seymour.
Atty.

UNITED STATES PATENT OFFICE.

FREDERIC A. LANE, OF NEW HAVEN, CONNECTICUT, ASSIGNOR TO THE NEW HAVEN CLOCK COMPANY, OF SAME PLACE.

ELECTRIC INDICATOR.

SPECIFICATION forming part of Letters Patent No. 427,879, dated May 13, 1890.

Application filed April 5, 1889. Serial No. 306,106. (No model.)

*To all whom it may concern:*

Be it known that I, FREDERIC A. LANE, residing at New Haven, in the county of New Haven and State of Connecticut, have invented certain new and useful Improvements in Electric Indicators; and I do declare the following to be a full, clear, and exact description of the same, reference being had to the accompanying drawings, which form a part of this specification.

My invention relates to an improvement in that class of electric indicating or annunciating apparatus in which variable signal-transmitters located at sub-stations are electrically connected with a receiver located at a central station and adapted to locate the respective transmitters as they are operated and to automatically reproduce the signals to which they are set, the object of this present invention being to simplify, widen the range, and increase the general efficiency of such an apparatus.

With these ends in view my invention consists in an electric indicating apparatus having certain details of construction and combinations of parts, as will be hereinafter described, and pointed out in the claims.

It may here be stated that the variable signal-transmitter illustrated and described herein is in respect of its circuit-interrupter a separate and independent invention from the receiver with which it is shown to present a complete apparatus, and is not claimed except in combination therewith.

Figure 1:
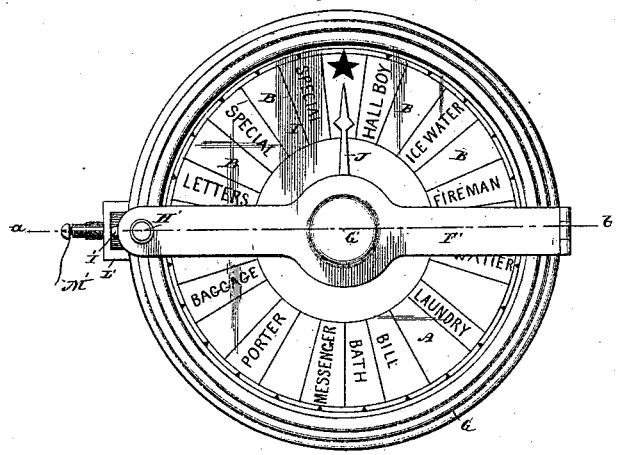
Figure 2:
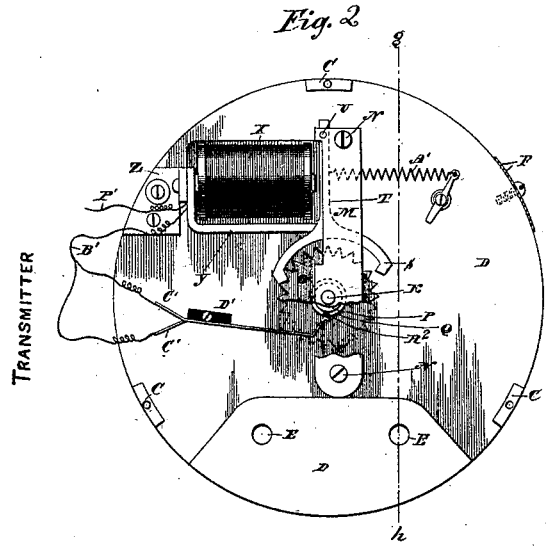
Figure 4:
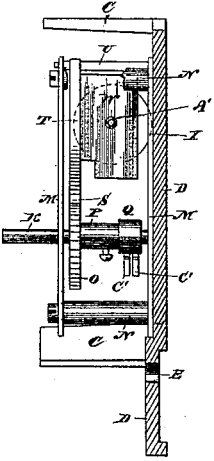
Figure 3:
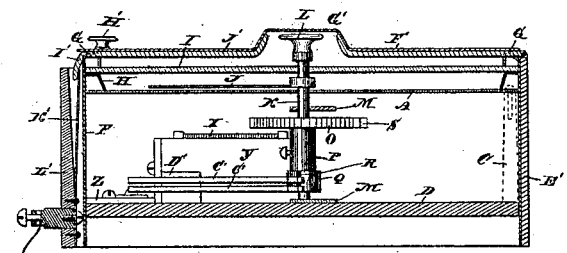
Figure 6:
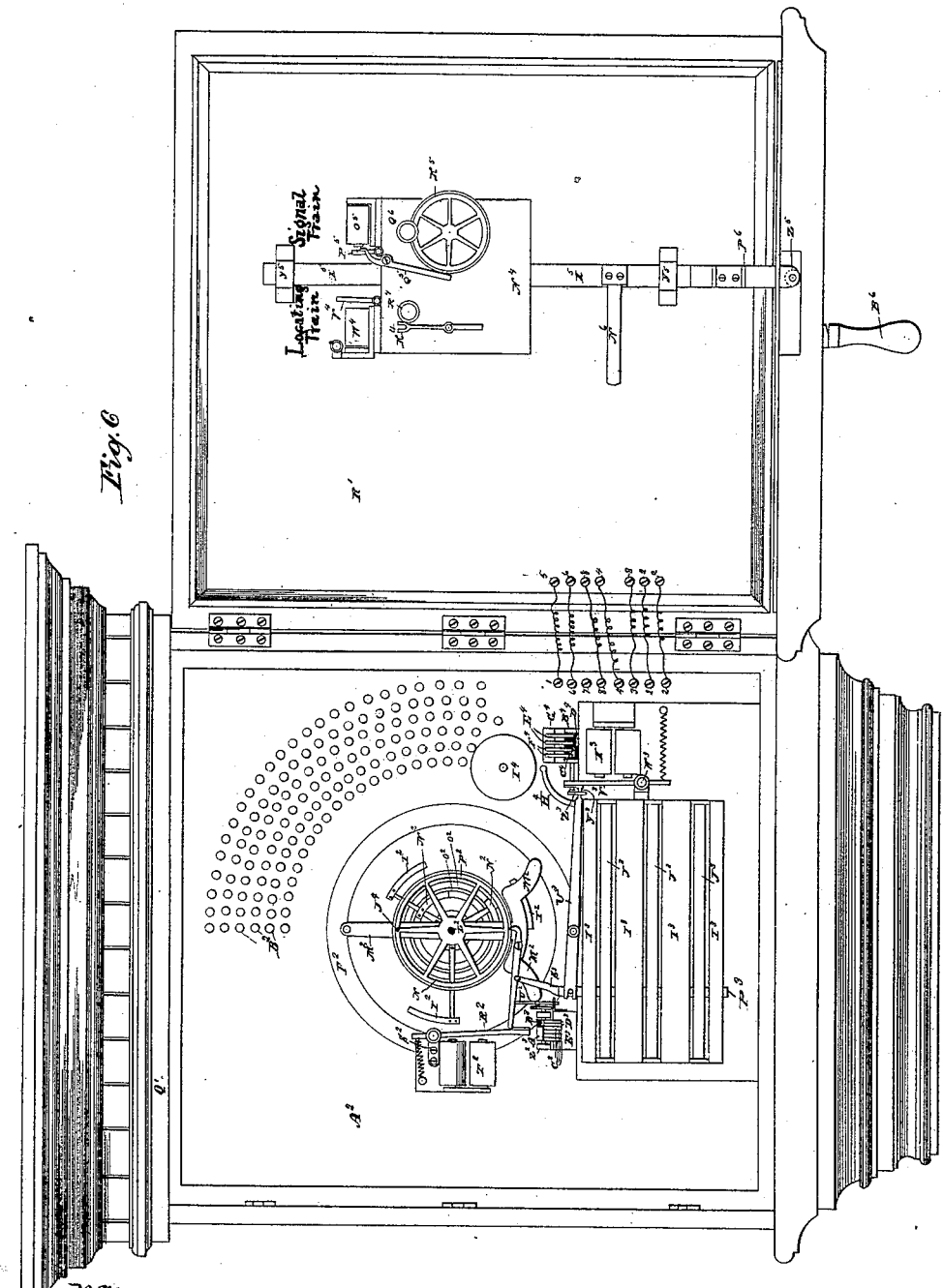
Figure 9:
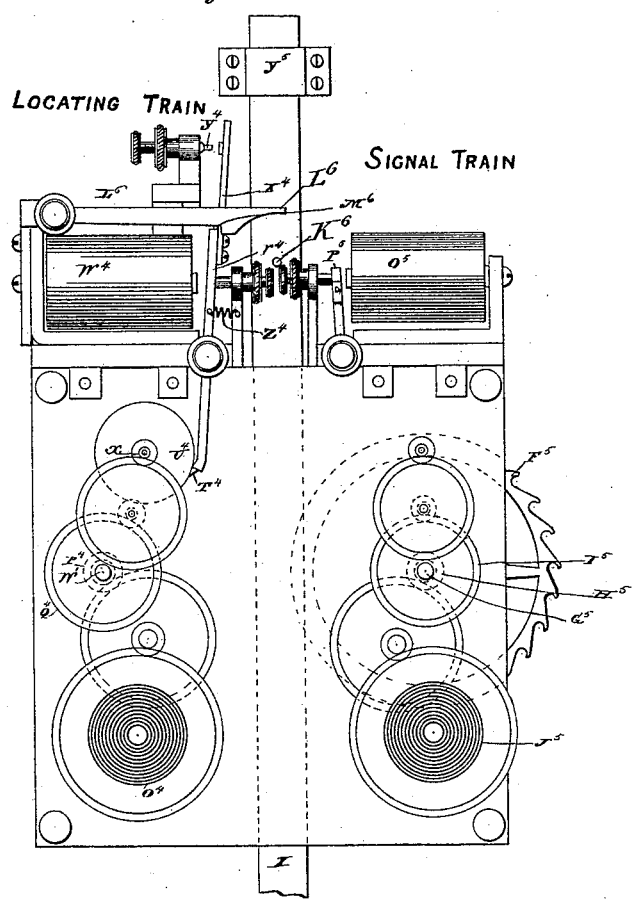
Figure 14:
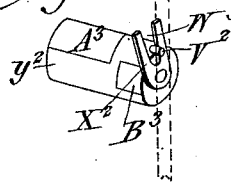
Figure 15:
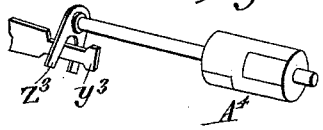
Figure 11:
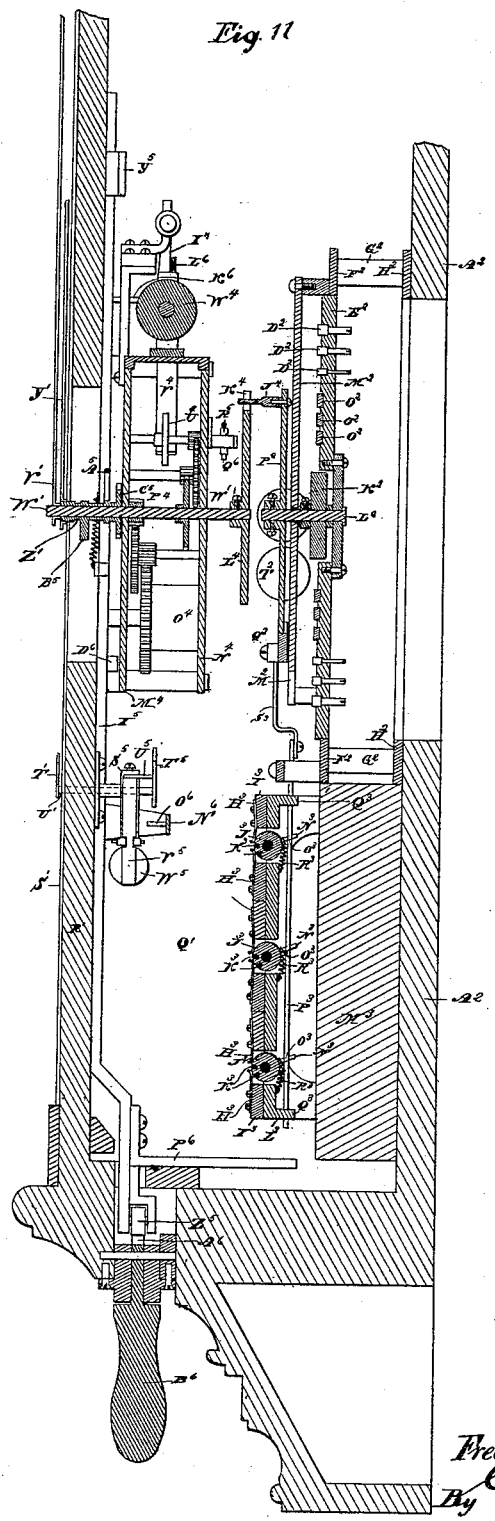
Figure 12:
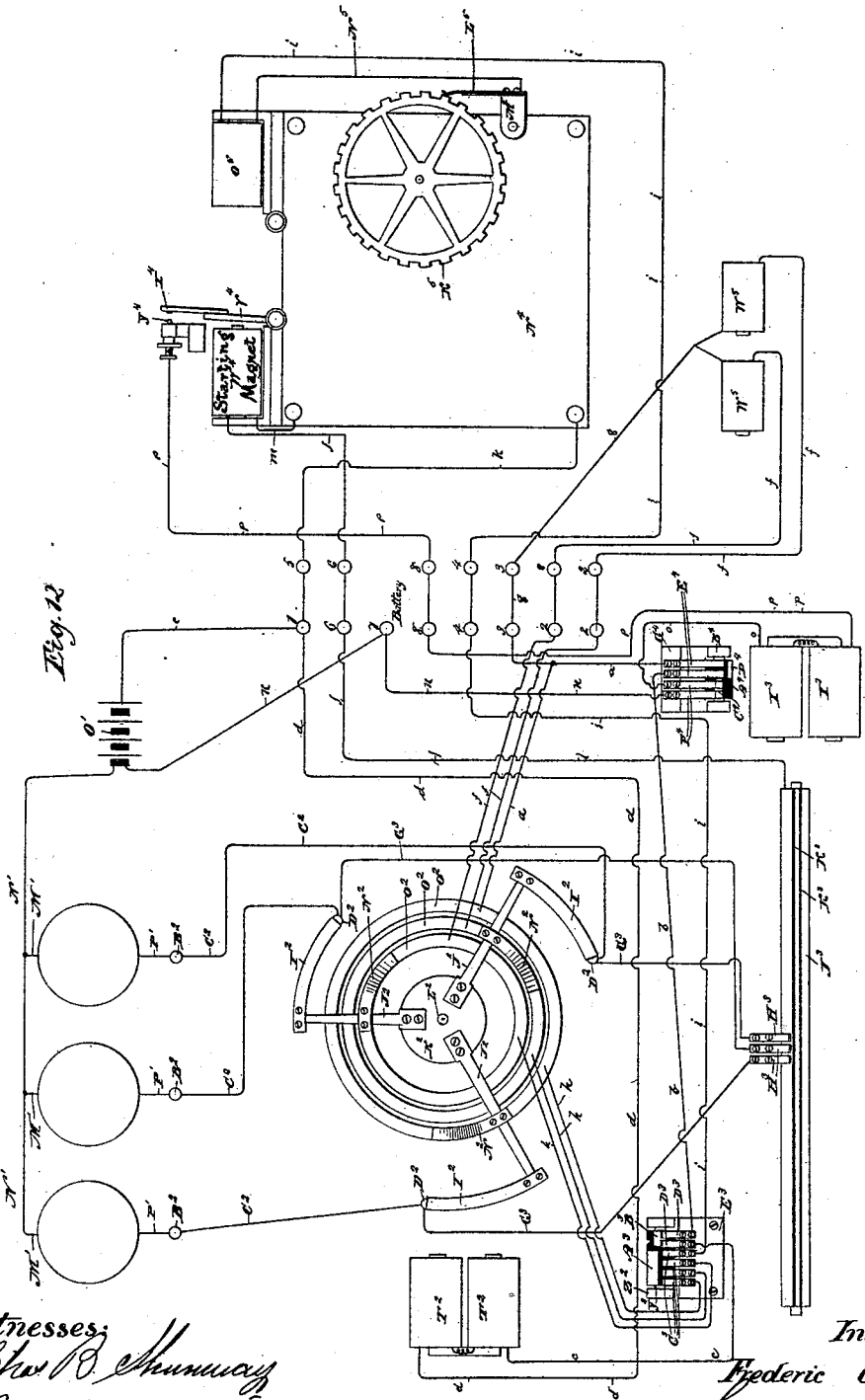

In the accompanying drawings, Figure 1 is a view in front elevation of one form which a variable signal-transmitter for use with my invention may assume, the hasp, forming the circuit-interrupter of the device, being closed. Fig. 2 is a similar view of the mechanism of such transmitter, the ring, the circuit-interrupter, and the dial having been removed, except a small portion of the ring, which is shown in section to illustrate the mode of its attachment to the back of the device. Fig. 3 is a view of the ring circuit-interrupter in section on the line $a\,b$ of Fig. 1, the other parts of the device being shown in an elevation taken from the point marked $c$ on Fig. 2. Fig. 4 is a sectional view of the device on the line $g\,h$ of Fig. 2. Fig. 5 is a view in front elevation of my improved receiver. Fig. 6 is a similar view thereof, drawn to a smaller scale and with its door open. Fig. 7 is a detached enlarged view in elevation of the mechanism located in the case of the receiver. Fig. 8 is a similar view of the mechanism attached to the back of the door of the said case. Fig. 9 is a similar view of the independent operating mechanism with its inner plate removed to disclose the locating-train and the signal-train. Fig. 10 is a detached reverse view of such mechanism, showing the signal-wheel and the means for restoring the signal-indicator to its normal or zero position. Fig. 11 is a broken view, in vertical section, on the line $d\,e$ of Fig. 5, looking in the direction of the arrows $f\,f$ on that figure, drawn to a slightly larger scale than the said figure and showing the mechanism located in the body of the case of the receiver and that attached to the door of the said case coupled for operation. Fig. 12 is a diagram showing the several circuits of the apparatus. Fig. 13 is an enlarged detached view in elevation of the switch-cylinder $Y^2$, the pin $V^2$, the slotted arm $X^2$, and the link $U^2$. Fig. 14 is a detached perspective view of the switch-cylinder $Y^2$, its slotted crank-arm $X^2$, and the pin $V^2$, which communicates motion to the same; and Fig. 15 is a corresponding view of the switch-cylinder $A^4$, its slotted crank-arm $Z^3$, and the necked end $Y^3$ of the switch-lever $U^3$, which communicates motion to the said crank-arm, and hence to the said cylinder.

The several signal-transmitters are alike, and a description of one will describe them all. The dial A of each of these instruments is divided into a circular series of radial compartments B, of which the uppermost contains a star indicating the zero-point and each of the remainder a signal, the whole number of signals embracing a series covering, as herein shown, the ordinary wants of a guest at a hotel, with a few specials, which will cover particular wants, memoranda of which may be left with the receiving-clerk at the hotel-office. The said dial is secured to three posts C, formed integral with a circular back D, having perforations E, through which screws are passed for securing the instrument to a wall or to any other suitable place for it.

A ring F, secured to the periphery of such back, forms with the same the case of the instrument, its outer edge being turned inwardly to form a shoulder G. (See Figs. 1 and 3.) A mat H, resting upon the dial, supports a centrally-perforated glass disk I, which it holds against the said shoulder G, and secures sufficient space between the dial and the glass disk for the reception and free actuation of an indicator J, rigidly secured to an arbor K, projecting through the dial and disk, and provided upon its projecting outer end with a knurled thumb-nut L, by means of which it is turned to bring the said indicator into alignment with any of the said compartments of the dial. The said arbor is journaled in a frame secured to the back D, and composed of plates M M and pillars N N, as shown. A star-wheel O, having the same number of teeth that the dial has compartments, is also rigidly secured to the arbor, being located between the plates M M and arranged so that the respective teeth correspond to the several compartments, whereby its rotation in either direction through a space represented by one or more of its teeth will be accompanied by a movement of the indicator over a corresponding number of compartments. The said arbor also carries a sleeve P, having at its inner end a circular flange Q, into the periphery of which is set a block R, of insulating material, the said flange and block forming the circuit-controller of the transmitter and also of the apparatus. The wheel is embraced and actuated by an anchor-shaped pallet S, provided with an arm T, secured at its outer end to a staff U, pivoted between the plates M M aforesaid. An armature W, secured to the said arm T, is located in the presence of the poles of a magnet composed of a coil X and an angled bar Y, of soft iron, the coil being attached to the short leg of such bar, the same leg whereof is secured to an angled brass plate Z, fastened to the back D of the instrument. A spiral spring A', attached to the said armature and the back D, holds the former normally away from the magnet. One end of the magnet-coil is connected, through a branched conductor B', with two flexible fingers C' C', engaging with the periphery of the flange Q and with the block R, located therein, and secured to a block D', of insulating material, attached to the back D aforesaid.

A strap E', secured to the ring F, carries at its outer end a circuit-interrupter consisting, as shown, of a hasp F', provided with a hollow boss G', adapted to fit over the thumb-nut L, an operating-button H', and an inwardly-projecting finger I', forming an extension of a stiffening-wire J', fastened to the under face of the hasp, which forms a guard for the thumb-nut. The said finger I' engages, when the hasp is closed, with a contact-spring K', inclosed in a chambered block L', of insulating material, secured to the ring F at a point opposite the strap before mentioned. A wire M' leads from the said contact-spring K' to the main wire N', which connects all of the transmitters in a series and includes a battery O' and the receiver. The other end of the coil X is connected to a special wire P', independently connecting the transmitter with the said receiver. If desired, these connections with the coil may be reversed.

The receiver, as herein shown, is designed for a three-hundred-room hotel, and has a case Q', adapted to be secured to a wall—say that of the hotel-office—and provided with a door or frame R', carrying upon its outer face a dial S', having a circular series of numbers extending from one to one hundred running from right to left and beginning at the center of its lower edge. Just above such point the dial is provided with the numbers 1 and 2, formed in large characters and normally concealed by drops T' T', carried by rotatable spindles U' U', operated to reverse the positions of the drops and expose and conceal the said characters, which are respectively used with the outer series of numbers to indicate all the numbers from one hundred and one up to two hundred and from two hundred and one up to three hundred, whereby the confusion which would result from and the space which would be required by a series running from one to three hundred is avoided. By the use of more numbers and drops the range of the receiver may be further increased without enlarging the dial. A "locating-indicator" V', so called because it locates the transmitters, is carried by a rotating spindle W', projecting centrally through the dial, and is normally at rest, being started and swept over the dial and stopped against the several numbers in the series aforesaid. Within the number series signals corresponding in character and location to those on the dials of the transmitters are reversely arranged in a circular series of compartments X' and specified by a signal-indicator Y', normally at rest over the zero or uppermost compartment and secured to a sleeve Z', mounted upon the spindle W' aforesaid.

By opening the door R' of the case Q' a button-board $A^2$, hinged in the back of the case at the opposite edge thereof from the said door, is disclosed. This board has mounted in it a binding-post $B^2$ for each of the whole number of transmitters, the special wires P'' whereof are brought through the back of the case and respectively attached to the said posts. Wires $C^2$ (see Fig. 12) lead from the said posts through an opening (see Fig. 11) in the said board to a corresponding number of terminals or contact-buttons $D^2$, arranged in three concentric circular series of one hundred buttons each and insulated each from the other in a flat rubber disk $E^2$, secured to a circular metallic plate $F^2$, held off from the board by means of pillars $G^2$, (see Fig. 11,) springing from a metallic ring $H^2$, secured to such board and inclosing the opening therein, the said buttons constituting the terminals of the special wires P' of the respective transmitters, of which those in the rooms of the hotel numbered from one up to one hundred have their terminals in the outer series of buttons, those in rooms numbered from one hundred and one through two hundred in the middle series of buttons, and those from two hundred and one through three hundred in the inner series of buttons. Three circuit-closers $I^2$, each consisting of a thin flat spring, are respectively arranged to sweep the three series of buttons, being attached to radial arms $J^2$, secured at equidistant points to a rubber disk $K^2$, (see Fig. 11,) mounted upon the inner end of a short shaft $L^2$, journaled centrally to the buttons in a three-armed frame $M^2$, extending over the disk $E^2$ and having the ends of its arms secured to the circular metallic plate $F^2$, before mentioned. Three brushes $N^2$, respectively secured to the three arms $J^2$, respectively sweep three concentric rings $O^2$, (see Fig. 12,) forming the receiver terminals of the main line and insulated each from the other in the disk $E^2$, the brush secured to the arm carrying the circuit-closer sweeping the outer series of buttons being arranged to sweep the outer ring, that carried by the arm supporting the circuit-closer of the middle series the middle ring, and that carried by the arm of the circuit-closer of the inner series sweeping the inner ring. The outer end of the short shaft $L^2$ has rigidly secured to it a locking-wheel $P^2$, which is therefore permanently and positively coupled with the circuit-closers, the same being rigidly connected with the said shaft, whereby the integrity of the relations between the wheel and closers is always preserved and reliability of indication secured. The face-teeth of the said wheel $P^2$ are engaged by the short arm of a locking-lever $Q^2$, (see Fig. 7,) pivoted to the frame $M^2$ at a point below the wheel and having the opposite end of its long arm engaged with an armature $R^2$, (see Fig. 7,) hung from its upper end in bearings $S^2$, and located in the presence of the poles of a magnet $T^2$, secured to an arm offsetting from the plate $F^2$ aforesaid. A link $U^2$, pivotally suspended from the long arm of the said lever, is provided with a pin $V^2$, (see Fig. 13,) entering a slot $W^2$, formed in the crank-arm $X^2$, attached to the shaft of a rubber switch-cylinder $Y^2$, horizontally mounted in a frame $Z^2$, and provided with brass blocks $A^3$ and $B^3$, respectively engaged by four fingers $C^3$ and two fingers $D^3$, all of which are insulated each from the other in a rubber block $E^3$, attached to the said arm $Z^2$. A spring $F^3$, connected with the long arm of the said lever and attached at its outer end to the ring $F^2$, is provided for engaging the short end of the lever with the locking-wheel the moment the long end thereof is released by the armature.

Branch wires $G^3$ lead from the respective buttons $D^2$ to corresponding fingers $H^3$, of which there is one for each button, and hence for each transmitter, the said fingers being secured to hard-rubber plates $I^3$, upon which they are insulated each from the other, and arranged in three groups of two rows each, so as to co-operate with three horizontal and rotatable brass make-and-break rods $J^3$, each provided with two insulating-strips $K^3$, arranged for engagement by the said fingers. The ends of the said rods are journaled in a frame $L^3$, also supporting the plate $I^3$ and secured to a heavy block $M^3$, attached to the board $A^2$, and located directly below the plate $F^2$, before mentioned. Pins $N^3$, (see Fig. 11,) projecting rearwardly from the respective rods, pass through openings $O^3$, formed for them in a vertical bar $P^3$, mounted in bearings $Q^3$, in which it moves vertically and projecting at its lower end below the frame $L^3$ for engagement, as will be described later on, for being lifted to rotate the said rods which it couples. Springs $R^3$, connected with the respective pins and with the back of the frame $L^3$, are provided for turning the rods back to their normal positions after they have been rotated by lifting the bar $P^3$, which is retracted at the same time.

I would have it understood that I make no claim to the arrangement of fingers, rotatable rods, and the connections thereof, just above described, and I would remark that such devices for simultaneously cutting out and cutting in all of the special transmitter-circuits may be replaced by any other suitable means for the purpose. The upper end of the said bar is provided with a finger $S^3$, (see Fig. 7,) adapted to be engaged with the longer arm of the said lever $Q^2$ and to operate when the bar is lifted to disengage the short arm of the lever from the locking-wheel and to recouple its longer arm with the lower end of the armature $R^2$. The upper end of the said bar is also provided with a pin $T^3$, connecting with the short arm of a horizontal switch-lever $U^3$, located just above the frame $L^3$ and having its long arm adapted to engage with the upper end of an armature $V^3$, pivotally mounted at its lower end in bearings $W^3$ and located in the presence of the poles of a magnet $X^3$, secured to the block $M^3$. The said arm of the lever is necked, as at $Y^3$, to adapt it to be engaged by a slotted crank-arm $Z^3$, secured to the shaft of a switch-cylinder $A^4$, journaled in a bracket $B^4$, secured to the frame $A^2$ and provided with two metallic blocks $C^4$ and $D^4$, (see Figs. 7 and 12,) respectively engaged by four fingers $E^4 E^4$ and $F^4 F^4$, attached to a rubber block $G^4$, fastened to the said bracket $B^4$. A bell-hammer $H^4$, secured to the long arm of the lever $U^3$, strikes, when the lever is released by the armature, a suitably-placed bell $I^4$. A coupling-pin $J^4$, projecting forward from the said locking-wheel $P^2$, enters, when the door $R'$ is closed, between the arms of a yoke $K^4$, (see Figs. 7 and 8,) formed at one end of a counterbalanced arm $L^4$, secured to the inner end of the spindle $W'$, carrying the locating-indicator $V'$, which is thus caused to operate in unison with the circuit-closers $I^2$ as they sweep over the contact-buttons D². When the described coupling between the pin and yoke is made, the circuit-closers, locking-wheel, and the said indicator are, for all purposes of reliability of indication, positively coupled together. The said spindle W' is journaled in two frame-plates M⁴ and N⁴, secured together and to the back of the door R' and corresponding to the two plates of a clock-movement, and actuated by a heavy coiled spring O⁴, (see Fig. 9,) located between such plates and driving a train of wheels and pinions, including a pinion P⁴ and a wheel Q⁴, mounted on the spindle W', which is thus actuated.

An escapement-wheel R⁴, (see Fig. 8,) engaged by a pallet S⁴, controls the running of the train, which is normally locked by the engagement of the stop-finger T⁴, located upon the periphery of one of its wheels U⁴, which is mounted on the same shaft with the escapement-wheel, with a detent formed by the tail of an armature V⁴, located in the presence of the poles of a magnet W⁴, mounted horizontally upon the upper edges of the plates M⁴ and N⁴ and located over the train just described, the upper end of this armature being provided with a finger X⁴, adapted to engage, when the magnet is energized and the armature attracted to its poles, with a contact-point Y⁴, insulated from the said plates. A light spiral spring Z⁴, attached to this armature, serves to hold it normally away from the poles of the magnet with its tail in position to be engaged by the stop-finger T⁴ of the wheel U⁴. The said train, which may be called the "locating-train," because it drives the locating-indicator, forms mechanical means for actuating the said indicator, leaving nothing for the current to do, so far as locating the transmitter is concerned, but to release the train, whereby I am enabled to operate my device with a very light current. The said spindle W' also carries the sleeve Z' (see Figs. 10 and 11) of the signal-indicator Y', such sleeve being provided with a heart-shaped cam A⁵, the function of which will be set forth later on, with a counterweight B⁵ for the said cam, and with a star-wheel C⁵, which is engaged and actuated by an anchor-shaped pallet D⁵, fulcrumed to the outer face of the outer plate M⁴ and having its tail provided with a spring E⁵, which is successively engaged by the teeth of a signal-wheel F⁵, secured to the forward end of an arbor G⁵, (see Fig. 9,) mounted in the plates aforesaid and carrying a pinion H⁵, and a wheel I⁵, constituting elements of a train actuated by a coiled spring J⁵, forming the motive power for the actuation of the signal-indicator Y' and corresponding to the spring O⁴, before described, the said train being controlled in running down by an escapement-wheel Q⁶ and a pallet R⁶. (Shown by Fig. 8 of the drawings.)

A make-and-break wheel K⁵, (see Fig. 8,)—a rheotome—secured to the inner end of the arbor G⁵ and located in the main circuit which includes the plates, is provided with cogs, which are engaged by a spring-finger L⁵, mounted on a rubber block M⁵, secured to the plate N⁴ and connected by a wire N⁵ with one end of the coil of a magnet O⁵, located in the main circuit, mounted upon the upper edges of the plates M⁴ and N⁴ at a point over the train of the spring J⁵ and provided with an armature P⁵, normally held in engagement with the cogs of the make-and-break-wheel by a spiral spring R⁵, as shown. The train last mentioned may be called the "signal-train," because its function is to actuate the signal-indicator Y', which reproduces the signals of the transmitters by specifying them upon the dial of the receiver. This train thus forms mechanical means for operating the signal-indicator, leaving nothing for the current to do, so far as the reproduction of the signal is concerned, but to release the signal-train, whereby I am enabled to work the apparatus with the minimum of current. The signal-train has also another important function in actuating the rheotome and thus relieving the current of that work.

The herein-shown gearing or connection between the indicator Y' and the signal-train, and consisting of the wheel F⁵, the spring E⁵, the pallet D⁵, and the star-wheel C⁵, may be replaced by any suitable gearing or connecting mechanism.

Although the locating and signal trains are herein shown to be operated by springs, it is apparent that they may be operated by weights. The two trains in themselves are composed of ordinary arbors, pinions, and wheels, of which only those directly co-operating with other features of the apparatus have been lettered, and this to avoid too many letters upon the drawings and to secure simplicity of description.

The spindles U' U', (see Fig. 8,) carrying the drops T' T' (see Fig. 5) at their forward ends, are respectively mounted in heads S⁵ S⁵, (see Fig. 8,) secured to the back of the door R'. Each spindle is provided at its rear end with a counter-weight T⁵, having an inwardly-projecting pin U⁵, (see Fig. 11,) normally engaging with the bent upper end of the tail of an armature V⁵, of which there is one for each spindle, these armatures being respectively located in the presence of the poles of two magnets W⁵ W⁵, also secured to the back of the door R'.

The long operating-lever X⁵, (see Fig. 8,) adapted to be vertically reciprocated in bearings Y⁵ Y⁵, secured to the back of the said door, is located between the same and the outer plate M⁴ of the two plates M⁴ and N⁴. This lever is provided at its lower end with an anti-friction roller Z⁵, which rests upon the arm A⁶ of a handle B⁶, pivoted in the lower edge of the door and operating, when it is swung from the vertical, to lift the lever. Pins C⁶ C⁶, (see Fig. 10,) located side by side and extending inwardly from the lever, are respectively engaged by the ends of horizontal winding-arms $D^6$ $D^6$, secured to the forward ends of the main arbors of the trains, to which the inner ends of the actuating-springs $O^4$ and $J^5$ are secured, whereby the lifting of the said operating-lever operates to wind the springs, and so furnish power for the actuation of the said locating and signal trains. The described engagement of the inner ends of the winding-arms and the said pins forms, so to speak, a flexible connection between the arms and the manual operating-lever. A two-armed lever $E^6$, pivoted to the lever $X^5$ at a point just above the pins aforesaid, is provided at the end of its long arm with an anti-friction roll $F^6$, adapted to engage, when the lever is lifted, with the periphery of the heart-shaped cam $A^5$ and invert the same, with the effect of restoring the signal-indicator $Y'$, carried by the sleeve $Z'$, which also carries the said cam, to its normal position, in which it points to the uppermost or zero compartment in the series of signal-compartments on the dial $S'$, the indicator and cam being arranged so that the indicator extends in exactly the opposite direction from that in which the depression of the cam normally faces.

In order to relieve the cam and the spindle carrying it from too great pressure from the said two-armed lever, the same is pivotally secured to the operating-lever, as described, and normally supported in its operating position by a spring $G^6$, one end of which is attached to its longer arm and the other end to a finger $H^6$, secured to the operating-lever, which is provided with a pin $I^6$, extending into an elongated horizontal slot $J^6$, formed in the short arm of the lever $E^6$ and co-operating with the pin to limit the rocking movement thereof. It will thus be seen that when the pressure of the roll $F^6$ on the heart-shaped cam exceeds a predetermined and safe amount, regulated by the spring $G^6$, the two-armed lever will retire and so prevent bending the spindle or any other straining of parts.

A long pin $K^6$, (see Figs. 8 and 11,) projecting inwardly from the upper end of the operating-lever, engages, when the lever is lifted, with the outer end of a horizontal catch $L^6$, pivoted over the magnet $W^4$ and provided upon its lower face with a short pin $M^6$, (see Figs. 8 and 9,) which is normally engaged with the upper end of the armature $V^4$ of the said magnet $W^4$, so that when the magnet is energized and the armature is withdrawn from under the pin the catch will drop by gravity and hold the armature in its attracted position, in which its lower end, forming a train-detent, is carried beyond the range of the stop-finger $T^4$ of the wheel $U^4$ of the locating-train, which will run as long as the armature is so held and there is any power in its actuating-spring $O^4$. When the operating-lever is lifted, its pin $K^6$ lifts the catch $L^6$ and permits the spring $Z^4$ to pull the armature back to its normal position and throw the detent thereof into the path of the stop-finger, so that the lifting of the operating-lever permits the said spring to stop the locating-train.

A horizontal arm $N^6$, (see Fig. 8,) secured to the operating-lever at a point below the plates $M^4$ and $N^4$, is provided with two pins $O^6$ $O^6$, respectively adapted to engage with the counter-weights $T^5$ $T^5$ and restore them, when the operating-lever is lifted, to their normal positions, in which their pins $U^5$ engage with the bent tails of the armatures $V^5$ of the drop-magnets $W^5$ $W^5$.

An arm $P^6$, projecting inwardly from the lower end of the operating-lever, is adapted to engage, when the door $R'$ is closed, with the lower end of the vertical bar $P^3$, which it lifts to different ends, as will be described later on.

The independent mechanism mounted between the plates $M^4$ and $N^4$ and including the locating and signal trains supplies the entire motive power for the apparatus, (except for the power required to step back the indicators of the transmitters,) such power being simply cut in, so to speak, by the electric current. The device, then, properly speaking, is a mechanical device controlling an electric current. By thus using mechanical power instead of electrical energy for actuating the receiver, I am enabled to greatly simplify and cheapen the construction of the same and reduce the expense of keeping it in repair, there being practically no expense for power which is applied by the operator, who, in resetting the receiver, winds the springs, and that without appreciating the additional effort required therefor. By making the circuit-closers and the locking-wheel form one mechanism and the trains and the stopping and starting devices form one mechanism and adapting the two mechanisms to be coupled together, as described, all of the parts, and particularly the terminals and the circuit-closers, are made very readily accessible for the purposes of attention and repair. Furthermore, by making the locking-wheel independent of the train by which it is operated it is unaffected by the lost motion or backlash thereof and the integrity of its locking action preserved thereby, whereas when the locking-wheel has been located in the train actuating it, as in prior constructions, it partakes of the lost motion thereof, with obvious detriment to the reliability of its performance in locking the circuit-closer and indicator coupled with it in the right place. By providing a catch to hold the detent of the locating-train in its retired position during the operation of the train the current is relieved of that duty, whereby battery-power is saved and the resistance in the machine greatly reduced. The cutting of the receiver-magnets out of the circuit as soon as they have done their work obviously effects the same results as just above mentioned.

The wiring of the transmitters was described in connection with their construction. That of the receiver will now be set forth. It has been explained that the special wires P' of the transmitters lead to contact-buttons in the receiver and that branch wires $G^3$ lead from such buttons to the respective contact-fingers $H^3$. The outer contact-ring $O^2$ is connected by a wire $a$ (see Fig. 12) with one of the two fingers $E^4$, the other finger $E^4$ of the pair being connected by a wire $b$ with one of the two fingers $D^3$, whereof the other finger is connected by a wire $c$ with one end of the coil of the magnet $T^2$, which is connected through a wire $d$ with the binding-post 1, having a wire $e$ leading to the battery. The middle and inner of the rings $O^2$ are connected by independent wires $f f$, leading through the posts 2 2 2 2, with the respective drop-magnets $W^5 W^5$, which are connected by a wire $g$ common to them both, through the posts 3 3, to the wire $a$, leading to the right-hand finger of the two fingers $E^4$. The three rings $O^2$ are also connected by independent wires $h$ to the three left-hand fingers $C^3$, the remaining finger of this group being connected through a wire $i$, leading through posts 4 4, to the magnet $O^5$, located in the main line and having the opposite end of its coil connected by a wire $N^5$ with the spring-finger $L^5$, from which the current flows to the make-and-break wheel $K^5$, and thence to the plate $N^4$, which is connected by a wire $k$, leading through a post 5, to the binding-post 1, having connection through the wire $e$ with the battery. All of the fingers $H^3$ are connected together through the make-and-break rods $J^3$, and hence with the frame $L^3$, in which they are mounted, such frame being connected by a wire $l$, leading through posts 6 6, with one end of the coil of the starting-magnet $W^4$, connected by a wire $m$ with the plate $N^4$, which, as before described, has a wire $k$ leading from it to the post 1. A wire $n$ leads from the battery through the post 7 to the left-hand of the two fingers $F^4$, the right-hand finger of this pair being connected by a wire $o$ to one end of the coil of the magnet $X^3$, which is connected by a wire $p$, leading through posts 8 8, to the contact-finger $Y^4$, engaging, when the magnet $W^4$ is energized, with the finger $X^4$, connected with the plates $M^4$ and $N^4$, and hence with the battery through the wires $k$ and $e$.

Having fully described my improved apparatus, I will now give an example of its operation. Let it be assumed that a guest in room numbered 34 desires that a messenger be sent to him. He goes to the transmitter in his room and grasps the button $H'$ of its hasp $F'$, which he then swings open to expose the thumb-nut L, at the same time cutting the instrument out of circuit by disengaging the finger I', connected with the instrument, and hence in the main line from the contact-spring $K'$, insulated from the instrument, but connected with the special line leading therefrom to the receiver. The thumb-nut is now turned to sweep the indicator of the transmitter from its normal position over the zero-compartment of the dial to the compartment thereof containing the word "Messenger," which is the thirteenth compartment from the zero-compartment counting from left to right. By turning the nut as described the rubber block R (see Figs. 2 and 3) in the flange Q is carried from under the fingers $C' C'$, and the edge of the flange brought into contact with the same without, however, closing the circuit through the transmitter, which is still cut out of the circuit. The described movement of the nut also rotates the star-wheel O in the same direction with the indicator through an arc represented by thirteen of its teeth. The indicator having now been set in the right place, the hasp is swung back over the thumb-nut and its finger I' is re-engaged with the contact-spring $K'$. A current will now flow from the battery O' through the main-line wire N', the contact-finger $K'$, the hasp F', the strap E', and the ring F to the back D of the instrument, and thence through the plates M M, the sleeve P the arbor K, and the flange Q to the contact-fingers $C' C'$, thence through the wire B' to the magnet X, thence through the special wire P' to its binding-post $B^2$ and contact-button $D^2$, flowing from the latter to the corresponding spring-finger $H^3$, thence through the make-and-break rod $J^3$ which the particular finger is engaged with to the frame $L^3$, thence through the wire $l$ (see diagram) and posts 6 6 to the magnet $W^4$, which it energizes, thence through the wire $m$ to the plate $N^4$, and thence through the wire $k$, posts 5 and 1, and wire $e$ to the battery again. The magnet $W^4$, when energized as described, attracts the armature $V^4$, the finger $X^4$ whereof is then engaged with the contact-finger $Y^4$, causing a current to flow from the battery through the wire $n$, post 7, the left-hand finger $F^4$, the block $C^4$, the right-hand finger $E^4$, the wire $o$, magnet $X^3$, wire $p$, posts 8 8, then through the said point $Y^4$, the finger $X^4$, the armature $V^4$, the plates $M^4$ and $N^4$, the wire $k$, posts 5 and 1, and the line $e$, and thence to the battery. The magnet $X^3$, being energized, pulls the upper end of its armature $V^3$ out from over the longer end of the lever $U^3$, and permits the springs $R^3$ to depress the vertically-movable bar $P^3$, and so rotate the make-and-break rods $J^3$ coupled therewith to bring the rubber strips $K^3$ under the fingers $H^3$, whereby all of the branch circuits through the said fingers are broken. When the said springs pull the bar down, the longer end of the lever $U^3$ flies up, whereby its bell-hammer $H^4$ is caused to strike the bell $I^4$ and the crank-arm $Z^4$ connected with it to rotate the switch-cylinder to carry the block $C^4$ out from under the fingers $F^4 F^4$, and thus cut the magnet $X^3$, which has just been energized, out of circuit, the described rotation of the switch-cylinder also operating to bring the block $D^4$ under the fingers $E^4 E^4$. The energization of the magnet $W^4$ and the attraction of the armature $V^4$ effect, also, the release of the locating-train of the receiver by withdrawing the detent of the said armature from the stop-finger T⁴ in the wheel U⁴. This train, being released, rotates the arm L⁴, coupled with the locking-wheel P², mounted on the shaft L² and carrying the arms J² of the circuit-closers I², which are swept over the contact-buttons D² until the closer sweeping the outer row of buttons comes in contact with the button with which the special wire P' of the transmitter in room 34 is connected. As soon as the closer touches this button a current flows from the battery through the arm carrying the closer, through the brush N² carried by such arm, through the outer ring O², thence through the wire $a$ to the right-hand finger E⁴, through the block D⁴, the left-hand finger E⁴, the wire $b$, the right-hand finger D³, the block B³, the left-hand finger D³, thence through the wire $c$ to the magnet T², thence through the wire $d$, the post I, and the wire $e$ to the battery. The said magnet T², being energized, pulls the armature R² away from the locking-lever Q², which is then immediately engaged by action of the spring F³ with the locking-wheel P², which for all indicating purposes is positively coupled with the locating-indicator V', carried by the same shaft W' and pointing to the number 34 on the dial S' of the receiver. As the spring F³ pulls down the outer end of the locking-lever, the link U², attached to the same, and the crank-arm X² combine to rotate the switch-cylinder Y² to carry the block B³ thereof out from under the fingers D³, whereby the magnet T² is cut out of circuit, and to cut the fingers C³ into the circuit by bringing the block A³ under them. The circuit through the fingers D³ D³ being broken, the current will flow through that one of the wires $h$ which is connected to the outer ring O², to the extreme left-hand finger C³, thence through the wire $i$ and posts 4 4 to the magnet O⁵, thence through the wire N⁵ to the finger L⁵, thence to the make-and-break wheel K⁵, and thence through the plate N⁴ to the wire $k$, the posts 5 and 1, and the wire $e$ to the battery. The magnet O⁵ being energized, its armature P⁵ is attracted to it, with the effect of pulling the stop-lever $g^5$ connected with it out of engagement with the make-and-brake wheel K⁵, which is rotated by the signal-train, which starts as soon as the wheel K⁵ is released. It may be noted here that the signal-train is automatically released by the locating-train acting through the circuit-closers and a magnet in the circuit. The wheel F⁵, rotating with the make-and-break wheel and acting through the anchor-shaped pallet B⁵ and the star-wheel C⁵, rotates the sleeve Z' and advances the signal-indicator Y' from right to left step by step over the signal-compartments on the dial S' of the receiver. As the cogs of the make-and-break wheel pass the finger L⁵, the main circuit is alternately made and broken. Every time this occurs the magnet in the transmitter will be energized, with the effect of attracting its armature and giving an impulse to the anchor-shaped pallet embracing the star-wheel, which will be turned back from right to left through the distance represented by one tooth every time the magnet is energized or the circuit is interrupted. These interruptions will go on until the insulating-block in the flange rotating with such wheel has been brought under the contact-fingers C' C' of the transmitter, and this will be, in the supposed case in hand, after the star-wheel has been turned back thirteen points, for it will be remembered that the compartment on the transmitter-dial containing the word "Messenger" is the thirteenth in number from the zero-compartment counting from left to right; but meanwhile for every make and break of the circuit effected by the wheel K⁵ the wheel F⁵ and the pallet D⁵ have moved the signal-indicator a step over the signal-compartments on the dial of the receiver, so that when the indicator in the transmitter is returned to its normal position the corresponding indicator of the receiver will be left over a signal corresponding to that to which the transmitter was set—in this case "Messenger." The breaking of the main circuit in the transmitter, as described, demagnetizes the magnet O⁵, and so releases its armature, whereby the stop-lever Q⁵ will be operated by the action of the spring R⁵ to lock the make-and-break wheel, and hence the signal-indicator Y'. It may be well to state here that the interruptions of the currents through the magnet X, caused by shunting it through the magnets W⁴, X³, and T², do not permit the said magnet X to operate in stepping the pointer J back each time the current is interrupted, and so destroying the correct operation of the apparatus, because the magnets W⁴ and X³ and T² are of such high resistance that the current which flows when they are included is insufficient to operate the said magnet X. It may be added that the magnet O⁵ corresponds in resistance, which is very low. It will thus be seen that in response to setting the transmitter in a certain room to a certain signal the receiver in the office has automatically located that room and reproduced the signal, the signal-reproducing mechanism having been automatically released and started in operation through the agency of the room-locating mechanism, and the apparatus having finally been stopped by the breaking of the circuit where it was originally closed. The return of the indicator of the transmitter to its position of rest also serves to indicate to the guest who has operated the instrument that the receiver has responded to his demand upon it. In case the transmitters are in rooms numbered over one hundred the circuit from the middle or inner contact-ring will be through one of the wires $ff$, one pair of the posts 2 2, and one of the magnets W⁵, thence through the common return-wire $g$ to the wire $a$, and thence to the right-hand finger E⁴, thus looping in one of the drop-magnets $W^5$. When one of these magnets is energized, it attracts its armature, and so pulls the tail thereof out from under the pin $U^5$ of the counter-weight $T^5$ combined with the magnet energized. The weight then drops and rotates the spindle $U'$, to which a drop $J'$ is attached, the drop being reversed to expose one of the large characters on the dial. The character thus exposed is read in conjunction with the outer series of numbers, as has been explained. Otherwise than as just above the operation of the apparatus for rooms above one hundred is the same as for rooms below one hundred. After the room has been located and the signal reproduced, as described, the operator—say the receiving-clerk—resets the receiver for operation with another transmitter by grasping the handle $B^6$ and swinging it to operate the operating-lever $X^5$. This effects the winding of the springs through the fingers $D^6 D^6$, the restoration of the signal-indicator to its normal position through the two-armed lever $E^6$ and the heart-shaped cam $A^5$, the release through the pin $K^6$ and catch $L^6$ of the armature $V^4$, so as to permit its tail to hold the signal-train, the restoration through the arm $N^6$ and its inwardly-projecting pins $O^6 O^6$ of the drops $T' T'$ to their normal positions, and the lifting through the arm $P^6$ of the vertically-movable bar $P^3$, whereby the make-and-break rods $J^3$ are rotated to cut in all of the fingers $H^3$, and whereby the locking-lever $Q^2$ is lifted to disengage it from the stop-wheel $P^2$, and so unlock the same and re-engage its opposite end with the armature $R^2$ of the magnet $T^2$, the switch-cylinder $Y^2$ rotated to cut in the fingers $D^3 D^3$ and to cut out the fingers $C^3$, and the lever $U^3$ lifted to re-engage it with the armature $V^3$ of the magnet $X^3$ and to rotate the switch-cylinder $A^4$ to cut in the fingers $E^4 E^4$ and to cut out the fingers $F^4 F^4$. It will thus be seen that the simple operation of swinging the handle $B^6$ is made use of to restore the several parts of the receiver to their normal positions of readiness to be operated upon demand of a transmitter and to wind the trains. In case more than one transmitter is set at a time the receiver will first respond to the demand of that transmitter which has its contact-button in advance of and nearest to its circuit-closer. After the receiver has responded to such transmitter and the operating-handle has been manipulated to restore the parts of the receiver to their normal positions, the receiver will then go on and respond to the demand of that transmitter having its contact-button in advance of and nearest to its circuit-closer, and so on, the operating-handle being manipulated between each operation of the receiver, and there being sufficient time between the successive indications of the same for the operator or clerk to give any orders that may be called for by the signals or wants. It will thus be seen that although several transmitters are set at the same time no interference results, but that the several numbers and signals are brought in without confusion in the order of the nearness of their contact-buttons to the circuit-closers, which discriminate only in favor of buttons ahead of them.

I disclaim—

First. The combination of an electric circuit, an electro-magnet included therein at a sub-station, an automatic rheotome for completing and interrupting the connections thereof at a main station, and a circuit-interrupting device at the sub-station normally breaking the circuit and closing the same when set, and brought into action by the said electro-magnet and serving to interrupt the connections of said circuit when a determinate number of interruptions and completions of the circuit have been occasioned by the said rheotome.

Second. The combination, with a series of variable signal-transmitters, each having an indicator, a circuit-controller, and a magnet, of a receiver having a transmitter-indicator, an automatically-started signal-indicator and a rheotome, and an electric circuit between the transmitters and receiver, including the magnets of the former and the rheotome of the latter, the interruptions of the circuit by the rheotome causing the magnets of the transmitters to restore the indicators thereof and break the said circuit.

Third. The combination, with a series of variable signal-transmitters, of a series of terminals respectively connected therewith, a circuit-closer normally at rest, and when in motion successively making contact with the said terminals which are located in its path, a detent for normally restraining the circuit-closer, a magnet for operating the detent to release the circuit-closer and controlled by the circuit between the transmitters and terminals, and a signal-indicator also controlled by the said circuit.

Fourth. In an electric indicator, the combination, with a series of signal-transmitters, of a corresponding series of terminals located at a receiving-station, a movable circuit-closer to engage with such terminals, an indicator normally coupled with the circuit-closer for locating the transmitters, and a locking-wheel for locking the said indicator in any of its positions, the circuit-closer and wheel being permanently coupled together, so that the integrity of their relations is always preserved and reliability of indication secured.

Fifth. The combination, with a variable signal-transmitter having an indicator, an electro-magnet for returning the same to its position of rest, and a circuit-controller, of a signal-indicator located at a receiving-station for reproducing any signal to which the transmitter may be set, an electro-magnet also located at the receiving-station, an electric circuit controlling such magnet, a detent constantly impelled to stop the signal-indicator and thereto released by the said circuit as soon as the signal has been reproduced, and an automatic rheotome located in the said circuit and interrupting the same, whereby the magnet of the transmitter operates to return the indicator thereof to its position of rest and to break the circuit.

Sixth. The combination, with the variable signal-transmitter having an indicator, an electro-magnet, and a circuit-controller, of an indicator situated at a receiving-station to locate the transmitter, a signal-indicator also located at the receiving-station and adapted to reproduce any signal to which the transmitter may be set, an electro-magnet located at the receiving-station, an electric circuit including the said magnets, a detent constantly impelled to stop the signal-indicator and thereto released by the said circuit when the signal has been reproduced, and an automatic rheotome mechanically connected with the signal-indicator and located in the said circuit and interrupting the same, whereby the magnet of the transmitter operates to return the indicator thereof to its position of rest and to break the circuit.

Having fully described my invention, what I claim as new, and desire to secure by Letters Patent, is—

1. An electric receiver having a locating-train and a signal-train, a locating-indicator connected with one train and a signal-indicator connected with the other train, a manual operating-lever, and connections between the trains and the lever, whereby both trains are wound up when the lever is operated, substantially as set forth.

2. An electric receiver having two actuating-trains, winding-arms secured to the main arbors thereof, and a manual operating-lever flexibly connected with such arms, whereby the trains are wound when the lever is manually operated, substantially as set forth.

3. In an electric receiver, the combination, with a locating-train and a signal-train, of a locating-indicator and a signal-indicator respectively operated by the said trains, two winding-arms respectively secured to the main arbors of the trains, and a manual operating-lever extending between the two trains and connected with each of the said arms, which extend inwardly toward it, whereby both trains are wound up when the lever is operated, substantially as set forth.

4. In an electric indicator, the combination, with a series of variable signal-transmitters, of a corresponding series of terminals located at a receiving-station, a movable circuit-closer to engage with such terminals, a locating-indicator, a locating-train for actuating the same, a signal-indicator, a signal-train for actuating the same, a lever for winding both of the said trains at one operation, an electric circuit between the transmitters and the receiving-station, and means located in the circuit for starting both trains, substantially as set forth.

5. In an electric indicator, the combination, with a series of variable signal-transmitters, of a corresponding series of terminals located at a receiving-station, a movable circuit-closer to successively engage with the said terminals, a locating-indicator, a locating-train for actuating the same, a signal-indicator, a signal-train for actuating the same, a heart-shaped cam coupled with the signal-indicator, an electric circuit between the transmitters and the receiving-station, means located in the circuit for starting the trains, and an operating-lever adapted at one operation to wind both of the said trains and move the heart-shaped cam in restoring the signal-indicator to its normal position, substantially as set forth.

6. In an electric indicator, the combination, with a series of variable signal-transmitters, of a corresponding series of terminals located at a receiving-station, a circuit-closer to successively engage with the said terminals, a locking-wheel coupled with the circuit-closer, and a mechanism mounted to be moved up to the circuit-closer for co-operation therewith and to be moved away therefrom, and comprising a locating-indicator, a signal-indicator, a locating-train, a signal-train, a rheotome, magnets for starting each of the said trains, and an operating-lever for winding both of the said trains at one operation, substantially as described.

7. In an electric receiver, the combination, with a series of terminals, of a circuit-closer adapted to successively engage with the same, a train for driving the said circuit-closer, a detent for normally restraining the operation of the train, a magnet for retiring the detent to release the train, an electric circuit controlling the said magnet, and a detainer for mechanically holding the detent in its retired position while the train is running, whereby battery-power is saved and the tension in the machine reduced, substantially as described.

8. In an electric receiver, the combination, with a series of terminals, of a circuit-closer adapted to successively engage with the same, a train for driving the said circuit-closer, a detent for normally restraining the train, a magnet for retiring the detent to release the train, an electric circuit controlling the said magnet, means for mechanically holding the detent in its retired position while the train is running, and a lever for freeing the detent from the means mechanically retaining it, substantially as described.

9. In an electric receiver, the combination, with a series of terminals, of a circuit-closer adapted to successively engage with the same, a train for driving the said circuit-closer, a detent for normally restraining the train, a magnet for retiring the detent to release the train, an electric circuit controlling the said magnet, a gravity-catch for holding the detent in its retired position, and means for operating the catch to permit the detent to resume its normal position, substantially as described.

10. An electric receiver having an indicator, a heart-shaped cam coupled therewith and having a depression in one end, and an operating-lever provided with a finger movable radially with respect to the cam and engaging with the periphery thereof to rotate the cam and restore the indicator to its normal position to which it is brought positively by the entrance of the finger into the depression in the cam, substantially as described.

11. An electric receiver having an indicator, a heart-shaped cam having a depression in one end coupled therewith, an operating-lever, and a yielding finger carried thereby and movable radially with respect to the cam and engaging, when the lever is operated, with the periphery of the cam, which it rotates until it enters the depression thereof and brings the cam to a positive stop and restores the indicator to its normal position, the yielding finger preventing undue strain upon the center on which the cam is mounted, substantially as described.

12. An electric indicator having a receiver provided with a series of terminals, a rotatable circuit-closer for engagement with such terminals, a train mounted upon a swinging door or frame, and coupling mechanism to couple the train with the circuit-closer when the door or frame is closed, but uncoupling them when the same is opened, substantially as set forth.

13. An electric indicator having a receiver provided with a series of terminals, and a rotatable circuit-closer carrying a coupling-pin to sweep over them, and a train mounted upon a swinging door or frame and provided with a yoke coupling with the said pin when the door or frame is closed, substantially as set forth.

14. An electric indicator having a receiver provided with a series of terminals, a rotatable circuit-closer, and mechanism constructed independent of the terminals and closer and including trains and magnets and train-controlling mechanism and mounted to be moved up to and away from the said terminals and closer, and coupling mechanism to couple one of the said trains with the circuit-closer when the said independent mechanism is moved toward the same and uncoupling the said parts when the said mechanism is moved away from the circuit-closer, substantially as set forth.

15. An electric indicator having a receiver provided with a series of terminals, a rotatable circuit-closer, a locking-wheel permanently connected therewith and carrying a coupling-pin, and a mechanism adapted to be moved away from the said terminals, closer, and wheel to give access to them, and including magnets, trains, train-controlling mechanism, and a coupling-arm for coupling with the said pin, substantially as set forth.

16. In an electric receiver, the combination, with a series of terminals, of a circuit-closer adapted to successively engage with the same, a train for driving the said circuit-closer, a detent for normally restraining the train, a magnet for retiring the detent to release the train, an electric circuit controlling the said magnet, a gravity-catch for holding the detent in its retired position, and an operating-lever adapted to wind the train and at the same time to operate the catch in releasing the detent, substantially as described.

17. In an electric indicator, the combination, with an actuating-train, an armature having a detent to hold the train when it is wound up, a magnet to operate the said armature, a catch to engage the armature to hold the detent away from the train after the magnet has been demagnetized, and an operating-lever adapted to wind up the train and to disengage the said catch from the said armature, substantially as set forth.

18. An electric receiver having a circuit-closer, a locking-wheel connected therewith, a horizontal locking-lever for engagement with such wheel, an armature for releasing the lever, a spring for engaging it with the wheel, an unlocking-finger adapted to be engaged with the lever to disengage it from the wheel and re-engage it with the armature, and a manual operating-lever operating such finger, substantially as set forth.

19. In an electric receiver, the combination, with a series of terminals, of a circuit-closer to successively engage the same, a train for actuating the circuit-closer, a detent for stopping the train, a magnet for retiring the detent to release the train, a locking-wheel coupled with the circuit-closer and not included in the train, a locking device for the said wheel, and a magnet for operating the said device, whereby backlash or lost motion in the train does not affect the integrity of the operation of the locking-wheel, substantially as described.

20. In an electric receiver, the combination, with a series of terminals, of a circuit-closer to successively engage the same, a locating-wheel rigidly coupled with the said circuit-closer, a locking device to lock the said wheel, a magnet for operating the said device, a train organized independently of the said circuit-closer and wheel and adapted to be connected with the same for rotating them, a train-detent for normally restraining the train, a magnet for operating the said detent, and an electric circuit controlling the said magnets, substantially as described.

21. In an electric receiver, the combination, with a series of terminals, of a circuit-closer to successively engage the same, a signal-indicator at said station, a train for actuating the said indicator, a heart-shaped cam rigidly connected with the indicator and interposed between the same and the train and having a yielding connection with the latter, and a lever adapted to engage with the periphery of the cam to return the same to its normal position, substantially as described.

22. In an electric receiver, the combination, with a series of terminals, of a circuit-closer to successively engage the same, a locating-indicator, a signal-indicator, a locating-train and a signal-train for respectively driving the said indicators, an electric circuit, and magnets and detents controlled by the current for first releasing the locating-train and then, after that has operated, the signal-train, substantially as described.

23. In an electric receiver, the combination, with a series of terminals, of a circuit-closer to successively engage the same, a locating-indicator, a signal-indicator, an electric circuit, a starting-magnet, a tripping-magnet, a locking-magnet, and a signal-magnet controlled by the circuit, and means for cutting the said magnets out of circuit as soon as they have operated, with the exception of the signal-magnet, substantially as described.

In testimony whereof I have signed this specification in the presence of two subscribing witnesses.

FREDERIC A. LANE.

Witnesses:
CHAS. B. SHUMWAY,
WM. J. DE MAURIAC.